(12) United States Patent
Saxby (10) Patent No.: US 8,367,920 B2
(45) Date of Patent: Feb. 5, 2013

(54) MUSIC NOTATION SYSTEM (76) Inventor: Michael Saxby, Oxford (GB)

( * ) Notice: Subject to any disclaimer, the term of this patent is extended or adjusted under 35 U.S.C. 154(b) by 7 days.

(21) Appl. No.: 12/973,140

(22) Filed: Dec. 20, 2010

(65) Prior Publication Data

US 2011/0192270 A1 Aug. 11, 2011

(30) Foreign Application Priority Data

Dec. 18, 2009 (GB) .................................. 0922245.6

(51) Int. Cl.
G09B 15/02 (2006.01)
(52) U.S. Cl. ...................................... 84/483.2
(58) Field of Classification Search .................. 84/483.2
See application file for complete search history.

(56) References Cited

U.S. PATENT DOCUMENTS

| 6,987,220 | B2 | 1/2006 | Holcombe |
| 7,148,414 | B2 | 12/2006 | Kestenbaum et al. |
| 2002/0178896 | A1* | 12/2002 | George ........................ 84/477 R |
| 2008/0314229 | A1* | 12/2008 | Robledo ....................... 84/483.2 |
| 2011/0003638 | A1* | 1/2011 | Lee et al. ........................ 463/35 |

* cited by examiner

Primary Examiner — Jianchun Qin
(74) Attorney, Agent, or Firm — McDonnell Boehnen Hulbert & Berghoff (57) ABSTRACT A method of creating a visual representation of a musical work. Data processing apparatus analyzes the work, determines attributes, including a the pitch and duration of each note, and creates a data file which is used output the work in a form readable by the human eye. Symbols representing notes are placed on a grid at vertical positions in accordance with their pitch, and horizontal positions representing time. A first basic symbol is assigned to the natural notes in an octave, a second basic symbol is assigned to sharp accidentals, and a third basic symbol is assigned to flat accidentals. The horizontal extent of the symbols represents note duration. Each of the seven natural notes in an octave is assigned a color and a vertical position on the grid, and the sharp accidental and flat accidental notes are assigned the same color and vertical position as the associated natural note.

8 Claims, 5 Drawing Sheets

MUSIC NOTATION SYSTEM

FIELD OF THE INVENTION

This invention relates to a method, apparatus and a software product for creating a visual representation of a musical work. In some embodiments, the apparatus and method analyses data representing a musical composition, converts the data into an alternative format, and provides visual output which represents the composition in a novel system of notation. However, the invention is also applicable to providing a visual output whilst music is being composed or being played.

BACKGROUND

Conventional music notation uses a staff of five horizontally extending, vertically spaced, parallel lines. The five lines, and the four spaces between them, define nine positions where notes can be positioned according to their pitch. These positions are for the principal notes within an octave—C, D, E, F, G, A and B. There are a further five notes within an octave, each as which can be expressed as either a sharp of one principal note or a flat or another. These five notes are therefore C sharp/D flat; D sharp/E flat; F sharp/G flat; G sharp/A flat; and A sharp/B flat. These notes are represented by "accidental" symbols positioned adjacent the appropriate principal note. The particular symbol representing a note depends, amongst other things, on the note's duration. For additional notes outside the range of the file lines and four spaces of the staff, individual ledger lines are provided at appropriate vertical positions.

There have been a number of proposals for alternative methods of musical notation which will make it easier for people to read music when they are playing an instrument. A number of these use different colours which are allocated to the individual notes. For example, U.S. Pat. No. 7,148,414 shows what is essentially a conventional notation arrangement but with the notes being coloured in accordance with their pitch. There is a conventional staff of five lines, with the notes being assigned to the lines and spaces in the conventional manner and changing only as regards the colours in which they are displayed or printed. They colours are defined in terms of CMYK attributes but it is believed that the seven colours for the notes A to G are, in that order, magenta, chocolate brown, black, light violet, yellow/green, violet and cyan. The five accidental notes are coloured in accordance with their natural note. The overall appearance is as complex as a conventional music score, but with the addition of colour attributes.

U.S. Pat. No. 6,987,220 represents notes in a different manner. Each note is represented by a rectangular symbol whose longitudinal extent represents the duration of the note. The notes, including the accidentals, are of different colours and in the described embodiment the arrangement is A—bright green; A sharp/B flat—pale green; B—bright yellow green; C—bright gold; C sharp/D flat—pale yellow; D—bright orange; D sharp/E flat—pale red orange; F—bright purple; F sharp/G flat—pale blue violet; G—bright blue; and G sharp/A flat—pale blue green. The note symbols are laid out on a grid with seven spaces per octave, to accept respective ones of the natural notes, and five staff lines are provided on which are positioned the five accidentals. Thus, there are twelve vertical positions per octave. The end result is a large number of lines bearing note symbols, which produces a somewhat complex appearance, particularly bearing in mind that a typical composition may have notes spanning more than one octave.

SUMMARY

Viewed from one aspect, the present information provides a method of creating a visual representation of a musical work which includes a plurality of notes, the method comprising the steps of using data processing apparatus (i) to analyse the musical work, (ii) for each note to determine attributes including at least the pitch and duration of the note and (iii) to create a data file which when accessed by the or another data processing apparatus will cause output of the musical work in a form readable by the human eye, in which:

(a) there is defined a grid with vertical positions at which symbols representing notes are placed in accordance with their pitch, and horizontal positions representing time;

(b) a first basic symbol is assigned to the natural notes in an octave, a second basic symbol is assigned to sharp accidentals; and a third basic symbol is assigned to flat accidentals, each of the first, second and third basic symbols having a basic horizontal extent corresponding to a basic note duration;

(c) each of said first, second and third basic symbols is provided with at least one modified form in which the horizontal extent of the modified symbol differs from that of the basic symbol, the modified symbol representing a note whose duration differs from the basic note duration;

(d) each of the seven natural notes in an octave is assigned a respective colour;

(e) for an octave the grid defines three or four vertical positions to receive note symbols, and each of the seven natural notes of an octave is assigned to one only of the vertical positions, there being three such vertical positions to which a plurality of natural notes is assigned;

(f) each of the sharp accidental notes is assigned the same colour and the same vertical position as the associated natural note; and (g) each of the flat accidental notes is assigned the same colour and the same vertical position as the associated natural note.

In preferred embodiments, in the visible notation, to cover the seven notes and five accidentals in an octave there will be no more that four vertical positions. If there are four vertical positions, then three of the positions will each be assigned two of the natural notes and the fourth vertical position will be assigned the remaining natural note. If there are three vertical positions, then two of the positions will each be assigned two of the natural notes and the third vertical position will be assigned the remaining three natural notes. The accidentals will be assigned to the same vertical positions as their associated natural notes. The allocation of the same vertical position to more than one note reduces the number of vertical lines of information that are used, and provides a less complex arrangement than in the prior art discussed above. This makes it easier for a musician to follow the score and to identify the correct notes and their durations.

In one preferred embodiment, in which there are four vertical positions for the notes of an octave, the natural notes are grouped together as follows: C and D on one line, the base line for the octave concerned; E and F on the next line; G and A on the next line; and B alone on the fourth line.

In one embodiment, the colours are assigned as follows: A—dark blue; B—orange; C—red; D—yellow; E—Green; F—pink; G—light blue.

The choice of the colours and the grouping of notes on the same horizontal line is chosen so that it will be easy to distinguish between two notes on the same line. For example, in one preferred embodiment, C and D are on the same line and are red and yellow. As noted above, in one embodiment C is read and D yellow, but in another embodiment the colours could be reversed. Similarly, E and F are on the same line and are respectively green and pink although the colours could be reversed; and G and A are on the same line and are respectively dark blue and an easily contrasted shade of light blue, but the colours could be reversed. B, orange, is on a line of its own.

One aim in some embodiments is to avoid using colours on the same line that could be confused by people who suffer from colour blindness. Common forms of colour blindness involve problems distinguishing between red and green, or distinguishing between blue and yellow.

Another possibility in some embodiments is to choose the colours used on the same line, in such a way that one is clearly darker than the other. The arrangement can then be that the darker colour represents the lower note and the lighter colour represents the higher note. However, the reverse protocol could be adopted, with the lighter colour representing the lower note. In any event, once a protocol has been decided, it will apply to all lines in the same manner.

In some preferred embodiments of the invention, the first, second and third basic symbols are blocks of solid colour so as to maximise visibility for a person reading the score.

Each of the basic symbols may be stretched or contracted as a whole to provide the modified form. Alternatively, or additionally, the basic symbol shape may be maintained, but is provided with an extension of different height, such as a line. The line could, for example, be about one half of the height of the basic symbol, or about one third, or about one quarter, or about one fifth. In some embodiments the basic symbol for the basic note duration is provided with an extension of different height for notes of longer duration, but the basic symbol is shortened as a whole for notes of shorter duration. In general, the method adopted is preferably the same for each of the first, second and third basic symbols so that there is a consistent approach; however, other arrangements would be possible.

The first basic symbol, for the natural notes, may be rectangular in shape, for example being a square or oblong for a single note duration, and either being an elongated bar for longer durations or having a line extending from it. For shorter notes, the basic symbol could be successively halved in its dimension in the horizontal direction. It would be possible to choose the shortest note used (for example a sixteenth or a thirty second) as the basic symbol and the extend from this. In the preferred embodiment, however, the most convenient size is established for a single note and taken as the basic symbol, and other note durations have symbols which are longer or shorter than this. In some preferred embodiments, the basic symbol is chosen for a single note duration. For durations greater than this, the symbol is extended by means of a line. For durations smaller than this, the basic symbol itself is reduced in length.

The second and third basic symbols could for example be triangles of different orientations to distinguish between sharp and flat accidentals. In one arrangement, the triangles are right angle triangles with one of the shorter sides extending vertically, the other of the shorter sides extending horizontally, and the hypotenuse extending diagonally upwards.

In one embodiment, the hypotenuse extends downwards towards the right of the vertical side for one of the accidental symbols, and the hypotenuse extends downwards towards the left of the vertical side for the other of the accidental symbols.

An alternative symbol for the sharp and flat accidentals could be a parallelogram, with two sides extending in the horizontal direction and two upwardly extending inclined sides. For the sharp accidentals, the upwardly extending sides could be inclined backwards, and for the flat accidentals, the upwardly extending sides could be inclined backwards, or vice versa. An alternative symbol would be a quadrilateral, with two sides extending in the horizontal direction, an initial upwardly extending inclined third side, and a vertically extending fourth side. For the sharp accidentals, the upwardly extending inclined side could be inclined backwards, and for the flat accidentals, the upwardly extending inclined side could be inclined backwards, or vice versa.

As with the natural note symbol, the sharp and flat accidental symbols may be stretched or contracted as a whole to provide the modified form. Alternatively, or additionally, the basic symbol shape may be maintained but is provided with an extension, such as a line. The line could, for example, be about one half of the height of the basic symbol, or about one third, or about one quarter, or about one fifth. For shorter notes, the basic symbol could be successively halved in its dimension in the horizontal direction. It would be possible to choose the shortest note used (for example a sixteenth or a thirty second) as the basic symbol and the extend from this. In the preferred embodiment, however, the most convenient size is established for a single note and taken as the basic symbol, and other note durations have symbols which are longer or shorter than this.

In some preferred embodiments, a rest may be indicated by a fourth basic symbol. This could be, for example, an outline symbol with a blank interior. The length of the rest is denoted by the horizontal extent of the symbol. The fourth basic symbol will have a basic length for a rest of a basic duration, and there will be at least one modified form for a rest of different duration. The basic symbol may be stretched or contracted as a whole to provide a modified form. Alternatively, or additionally, the basic symbol shape may be maintained, but is provided with an extension of different height, such as a line. The line could, for example, be about one half of the height of the basic symbol, or about one third, or about one quarter, or about one fifth. In some embodiments the basic symbol for the basic rest duration is provided with an extension of different height for rests of longer duration, but the basic symbol is shortened as a whole for rests of shorter duration. The method adopted may be the same as for the first, second and third basic symbols so that there is a consistent approach. However, depending on the nature of the rest symbol it may be appropriate to use a different system for rests.

The basic rest symbol may correspond in shape to the first basic symbol used for the natural notes, but being in outline form rather than a block of solid colour although a contrasting colour or pattern could be used. The colour of the rest symbol will be chosen so as not to conflict with the colours of the natural notes. One suitable colour for an outline would be black. In such arrangement, rests of longer duration may be depicted by extending the length of the symbol, even if notes of longer duration are depicted by adding an extension to a basic note symbol.

Conventional musical marks such as the treble or bass clef, and indications such as p, pp, f, ff for loudness, or < and > for crescendo and diminuendo, ties, comments and so forth can still be included.

Preferably, the grid/lines for additional octaves are only shown if they contain notes. For the higher and/or lower octaves, there may be fewer grid lines if a full grid is not required to show all the notes. This enables the overall appearance to be compressed.

The grids themselves may not be visible to a user. Thus, whilst note symbols may be arranged on three or four rows, lines between the rows may not be shown. Preferably, at least the lowest horizontal line is shown, and preferably the bar between two octaves. Vertical bar lines will be shown in any event. In some arrangements bar lines and the base line may be shown clearly, whilst the lines delimiting the individual rows may be shown more faintly.

In some preferred embodiments of the invention, there are spaces between consecutive notes, whatever vertical positions they occupy, to make it easier to distinguish between them. In such an arrangement there will be a space between the last note in a bar and the bar line, as there will normally be a symbol starting the next bar—whether it is a rest or a note. Preferably, the horizontal extent of a bar—as seen—is dynamic, expanding and contracting in accordance with the number of notes and spaces. If there is a single note whose duration occupies an entire bar, then the bar length as seen will be that note plus a space at the end. If there are eight consecutive short notes in a bar, then the visible bar length will be the cumulative duration of the eight notes, plus seven spaces between them, plus a space at the end. The use of such a variable length of visible bar also make it possible to match lyrics that are also displayed, in the case of a song.

The use of changing the horizontal scale of a bar can also assist if there are very short notes, such as 1/32 or 1/64. To ensure that these notes are clearly visible, the horizontal scale could be increased as compared to that used normally when, for example, the longest note is 1/8. In one embodiment, the scale could be double that used normally. This will make the short notes appear twice as wide, making them more visible.

Whilst the expressions "vertical" and "horizontal" have been used, this does not imply ay particular orientation with respect to the earth. Instead, the terms refer to the up/down direction and the left/right direction on a piece of paper, computer monitor or other means of displaying the music, regardless of the absolute direction that may be in.

Where references are made to shapes such as squares, rectangles, triangles or parallelograms, this does not imply that the shapes are perfect geometrically. There may be deviations from straight lines, corners may be rounded or chamfered, and so forth.

In embodiments of the invention, the data processing apparatus may analyse a musical work that is be in the form of machine readable data initially, such as music as a MIDI file or a music XML file, or the like. The data processing apparatus could be connected to a scanner that can scan printed music and create a data file. However, the system may permit a person to compose a piece of music and produce a visual output in the novel notation for that composition. The system may also analyse music that is being played, to create a visual representation in the novel format.

Once a piece of music has been put into the new notation, or whilst the system is carrying out creation of the notation, the music may be played and the progress of creating the notation may be shown live on a computer monitor or other output device.

The invention extends to data processing apparatus configured specifically to carry out the method of the invention. Thus, viewed from another aspect, the invention provides data processing apparatus configured specifically to create a visual representation of a musical work which includes a plurality of notes, the data processing apparatus being configured (i) to analyse the musical work, (ii) for each note to determine attributes including at least the pitch and duration of the note and (iii) to create a data file which when accessed by the or another data processing apparatus will cause output of the musical work in a form readable by the human eye, in which:

(a) there is defined a grid with vertical positions at which symbols representing notes are placed in accordance with their pitch, and horizontal positions representing time;

(b) a first basic symbol is assigned to the natural notes in an octave, a second basic symbol is assigned to sharp accidentals; and a third basic symbol is assigned to flat accidentals, each of the first, second and third basic symbols having a basic horizontal extent corresponding to a basic note duration;

(c) each of said first, second and third basic symbols is provided with at least one modified form in which the horizontal extent of the modified symbol differs from that of the basic symbol, the modified symbol representing a note whose duration differs from the basic note duration;

(d) each of the seven natural notes in an octave is assigned a respective colour;

(e) for an octave the grid defines three or four vertical positions to receive note symbols, and each of the seven natural notes of an octave is assigned to one only of the vertical positions, there being three such vertical positions to which a plurality of natural notes is assigned;

(f) each of the sharp accidental notes is assigned the same colour and the same vertical position as the associated natural note; and (g) each of the flat accidental notes is assigned the same colour and the same vertical position as the associated natural note.

The invention further extends to a computer software product that will enable the invention to be put into effect. Such a computer software product may be in the form of physical media such as a DVD, CD, solid state memory module or the like, or in the form of signals transmitted form a remote location over a local area network, a wide area network, or the Internet, for example. In preferred embodiments the computer software product is in non-transitory form and comprises a physical medium carrying instructions to be carried out by data processing apparatus.

Viewed from another aspect the invention provides a computer software product in the form of a non-transitory physical medium carrying instructions that when carried out by data processing apparatus, will cause the data processing apparatus to create a visual representation of a musical work which includes a plurality of notes, the data processing apparatus being configured (i) to analyse the musical work, (ii) for each note to determine attributes including at least the pitch and duration of the note and (iii) to create a data file which when accessed by the or another data processing apparatus will cause output of the musical work in a form readable by the human eye, in which:

(a) there is defined a grid with vertical positions at which symbols representing notes are placed in accordance with their pitch, and horizontal positions representing time;

(b) a first basic symbol is assigned to the natural notes in an octave, a second basic symbol is assigned to sharp accidentals; and a third basic symbol is assigned to flat accidentals, each of the first, second and third basic symbols having a basic horizontal extent corresponding to a basic note duration;

(c) each of said first, second and third basic symbols is provided with at least one modified form in which the horizontal extent of the modified symbol differs from that of the basic symbol, the modified symbol representing a note whose duration differs from the basic note duration;

(d) each of the seven natural notes in an octave is assigned a respective colour;

(e) for an octave the grid defines three or four vertical positions to receive note symbols, and each of the seven natural notes of an octave is assigned to one only of the vertical positions, there being three such vertical positions to which a plurality of natural notes is assigned;

(f) each of the sharp accidental notes is assigned the same colour and the same vertical position as the associated natural note; and (g) each of the flat accidental notes is assigned the same colour and the same vertical position as the associated natural note.

It will be appreciated that the reference to the data processing apparatus being configured to carry out certain steps, encompasses the apparatus being specifically configured to carry out those steps automatically.

Various modifications of the preferred embodiments and of the aspects of the invention set out above are possible. For example, in a simple arrangement in which a player only plays a single note at a time, the notes could all be depicted at the same vertical position, i.e. on a single horizontal line. In an arrangement in which a player might play two notes at a time, there could be two vertical positions. It would also be possible to have an arrangement with seven vertical positions, one for each of the seven natural notes in an octave. This would still result in a less cluttered arrangement than in the prior art because the sharp and flat accidentals would be on the same line as their corresponding natural note.

Accordingly, viewed from another aspect the invention provides a method of creating a visual representation of a musical work which includes a plurality of notes, the method comprising the steps of using data processing apparatus (i) to analyse the musical work, (ii) for each note to determine attributes including at least the pitch and duration of the note and (iii) to create a data file which when accessed by the or another data processing apparatus will cause output of the musical work in a form readable by the human eye, in which:

(a) there is defined a display layout with at least one horizontally extending line on which symbols representing notes are placed, the horizontal position of a note representing the time for playing the note;

(b) a first basic symbol is assigned to the natural notes in an octave, a second basic symbol is assigned to sharp accidentals; and a third basic symbol is assigned to flat accidentals, each of the first, second and third basic symbols having a basic horizontal extent corresponding to a basic note duration;

(c) each of said first, second and third basic symbols is provided with at least one modified form in which the horizontal extent of the modified symbol differs from that of the basic symbol, the modified symbol representing a note whose duration differs from the basic note duration;

(d) each of the seven natural notes in an octave is assigned a respective colour;

(e) each of the sharp accidental notes is assigned the same colour as the associated natural note and is allocated to the same horizontal line as that of associated natural note; and (f) each of the flat accidental notes is assigned the same colour as the associated natural note and is allocated to the same horizontal line as that of associated natural note.

In one embodiment, there is a single horizontal line on which symbols representing all of the notes in an octave are placed.

In preferred embodiments there are provided two or more vertically spaced lines. In the case of simple instrument with right and left hand requirements, each hand playing only one note at a time, there could be two lines only, and in that cases allocated to one hand each. The notes could then be allocated to a line in accordance with the hand that is to play them. Alternatively, each natural note could be allocated to one only of the two lines.

Preferably, and for more complex arrangements, there are at least three lines and each natural note is allocated to one only of the lines. Preferably, in the case of three lines, two lines each have two notes allocated to them, and one line has three notes allocated to it. A preferred form is as discussed above in relation to other aspects of the invention, in which there are four lines, with three lines each having two notes allocated to them, and one line having one note allocated to it. An further possibility is for the seven natural notes of an octave each to be allocated to one only of seven lines.

This aspect of the invention also extends to apparatus for carrying out the method and to software for configuring apparatus to carry out the method.

The various optional features discussed and disclosed in respect of the other aspects of the invention and of the described embodiments thereof, are applicable to this aspect of the invention also, except to the extent that any are incompatible with this aspect of the invention. Similarly terminology used in relation to the current aspect of the invention, is applicable to other aspects of the invention except where incompatible. By way of example, where there is a reference to a "grid" this may be replaced by a reference to the expression "a display layout with at least one horizontally extending line", or a "a display layout with a plurality of vertically spaced horizontally extending lines". In general, features, optional features and terminology used in relation to any embodiment or any aspect of the invention may be combined with features, optional features and terminology used in relation to any other embodiment or any other aspect of the invention.

The invention also extends to a computer data product in the form of data for data processing apparatus which will output visually a musical score in accordance with the notation produced by any of the methods in accordance with the invention. The data may be in the form of physical media such as a DVD, CD, solid state memory module or the like, or in the form of signals transmitted form a remote location over a local area network, a wide area network, or the Internet, for example. The invention also extends to a printed musical score which is in accordance with the notation produced by any of the methods in accordance with the invention. The printed score may be on any suitable substrate, such as paper. These aspects of the invention also apply to the data or printed musical score even if generated ab initio or otherwise without conversion from another format.

Thus, viewed from another aspect the invention provides a data product for data processing apparatus carrying data which will cause the data processing apparatus to provide a visible output of a musical score in which:

(a) there is a display layout with at least one horizontally extending line on which symbols representing notes are placed, the horizontal position of a note representing the time for playing the note;

(b) a first basic symbol is assigned to the natural notes in an octave, a second basic symbol is assigned to sharp accidentals; and a third basic symbol is assigned to flat accidentals, each of the first, second and third basic symbols having a basic horizontal extent corresponding to a basic note duration;

(c) each of said first, second and third basic symbols is provided with at least one modified form in which the horizontal extent of the modified symbol differs from that of the basic symbol, the modified symbol representing a note whose duration differs from the basic note duration;

(d) each of the seven natural notes in an octave is assigned a respective colour;

(e) each of the sharp accidental notes is assigned the same colour as the associated natural note and is allocated to the same horizontal line as that of associated natural note; and (f) each of the flat accidental notes is assigned the same colour as the associated natural note and is allocated to the same horizontal line as that of associated natural note.

Viewed from another aspect of the invention there is provided a physical substrate on which is printed a musical score, in which:

(a) there is a display layout with at least one horizontally extending line on which symbols representing notes are placed, the horizontal position of a note representing the time for playing the note;

(b) a first basic symbol is assigned to the natural notes in an octave, a second basic symbol is assigned to sharp accidentals; and a third basic symbol is assigned to flat accidentals, each of the first, second and third basic symbols having a basic horizontal extent corresponding to a basic note duration;

(c) each of said first, second and third basic symbols is provided with at least one modified form in which the horizontal extent of the modified symbol differs from that of the basic symbol, the modified symbol representing a note whose duration differs from the basic note duration;

(d) each of the seven natural notes in an octave is assigned a respective colour;

(e) each of the sharp accidental notes is assigned the same colour as the associated natural note and is allocated to the same horizontal line as that of associated natural note; and (f) each of the flat accidental notes is assigned the same colour as the associated natural note and is allocated to the same horizontal line as that of associated natural note.

The present invention is not concerned with the aesthetic content of a musical score but with the improved notation system and grid layout that makes it easier for a person to follow the music and identify the correct notes and durations.

BRIEF DESCRIPTION OF THE DRAWINGS

The invention will be better understood by reference to the detailed description of some embodiments of the invention which are by way of example only, in conjunction with the accompanying drawings, in which:

FIGS. 2 (*a*), 2 (*b*), 2 (*c*) and 2 (*d*) show the symbols used in one embodiment of the invention;

FIGS. 3 (*a*), 3 (*b*), and 3 (*c*) show the symbols used in another embodiment of the invention;

DETAILED DESCRIPTION OF THE PREFERRED EMBODIMENTS

Figure 1:
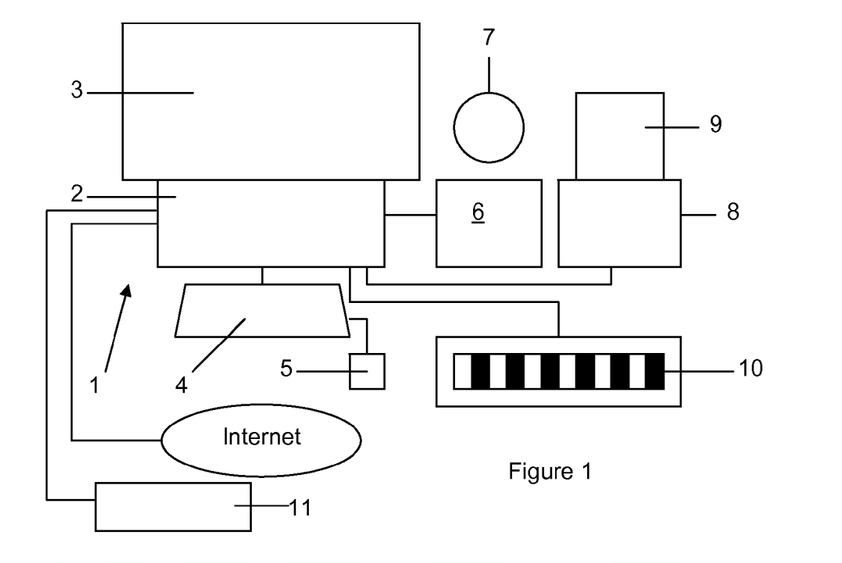
FIG. 1 is a diagrammatic view of data processing apparatus for use in accordance with the present invention.
Figure 2A:
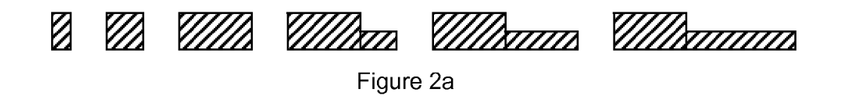
Figure 2B:
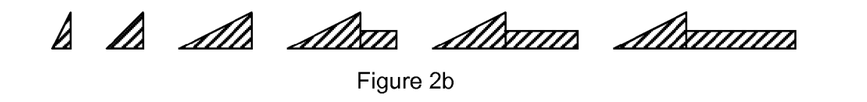
Figure 2C:
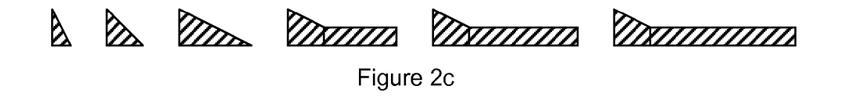
Figure 2D:
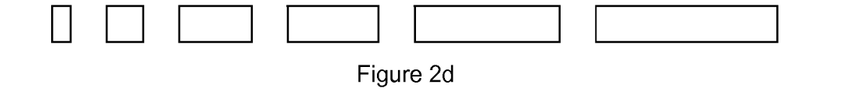

In FIG. 1 there is shown data processing apparatus 1 in the form of a desktop personal computer comprising a processing unit 2 which includes a microprocessor, bulk storage in the form of a hard disk drive, random access memory, read only memory, and other standard components. The computer also includes a display monitor 3, an alphanumeric keyboard 4 and a mouse 5. Input devices for the computer include a drive 6 for a disc 7, such as a CD or DVD, which may contain a music data file or a recording of music; a scanner 8 which can scan sheet music 9, and a musical keyboard 10 which can be used to compose music. In addition to the monitor 3 which provides a visual display of music with the new notation, there is a printer 11. The computer is also connected to the Internet so as to receive data such as a MIDI file, and to transmit data such as a file of a musical composition in accordance with the new notation.

FIGS. 2 (*a*) to 2 (*d*) show symbols used in one embodiment of the invention. FIG. 2 (*a*) shows the symbols for a natural note, of increasing duration from left to right. The first three symbols are rectangular. The last three symbols have a common rectangular portion and then a half height rectangular extension. FIG. 2 (*b*) shows the symbols for a sharp note, of increasing duration from left to right. The first three symbols are right angle triangles, with the hypotenuse facing to the left, i.e. inclining down to the bottom left. The last three symbols have a common triangular portion, a right angle triangle with the hypotenuse facing to the left, and then a half height rectangular extension. FIG. 2 (*c*) shows the symbols for a flat note, of increasing duration from left to right. The first three symbols are right angle triangles, with the hypotenuse facing to the right, i.e. inclining down to the bottom right. The last three symbols have a common triangular portion, a right angle triangle with the hypotenuse facing to the right, and then a half height rectangular extension. In use the symbols of FIGS. 2 (*a*) to (*c*) would be coloured. FIG. 2 (*d*) shows the symbols for a rest, of increasing duration from left to right. Each symbol is the outline of a rectangle with a blank interior.

Figure 3A:
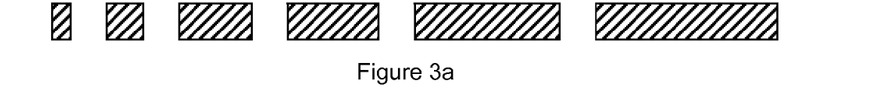
Figure 3B:
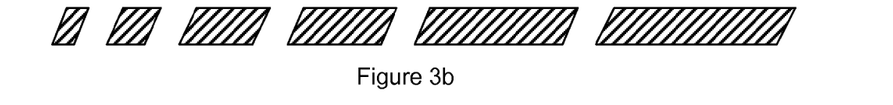
Figure 3C:
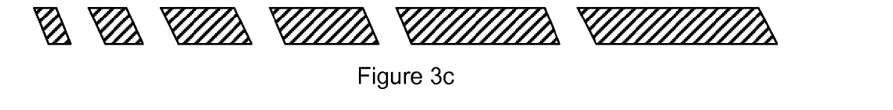

FIGS. 3 (*a*) to (*c*) show the symbols used in an alternative embodiment of the invention. FIG. 3 (*a*) shows the symbols for a natural note, of increasing duration from left to right.

The symbols are rectangular, of increasing length. FIG. 3 (b) shows the symbols for a sharp note, of increasing duration from left to right. The symbols are parallelograms of increasing length, with flat upper and lower boundaries and left and right boundaries which slant towards the right. FIG. 3 (c) shows the symbols for a flat note, of increasing duration from left to right. The symbols are parallelograms of increasing length, with flat upper and lower boundaries and left and right boundaries which slant towards the left. In use the symbols of FIGS. 3 (a) to (c) would be coloured. In the embodiment the symbols for a rest are the same as those of FIG. 2 (d), each symbol being the outline of a rectangle with a blank interior.

Figure 4:
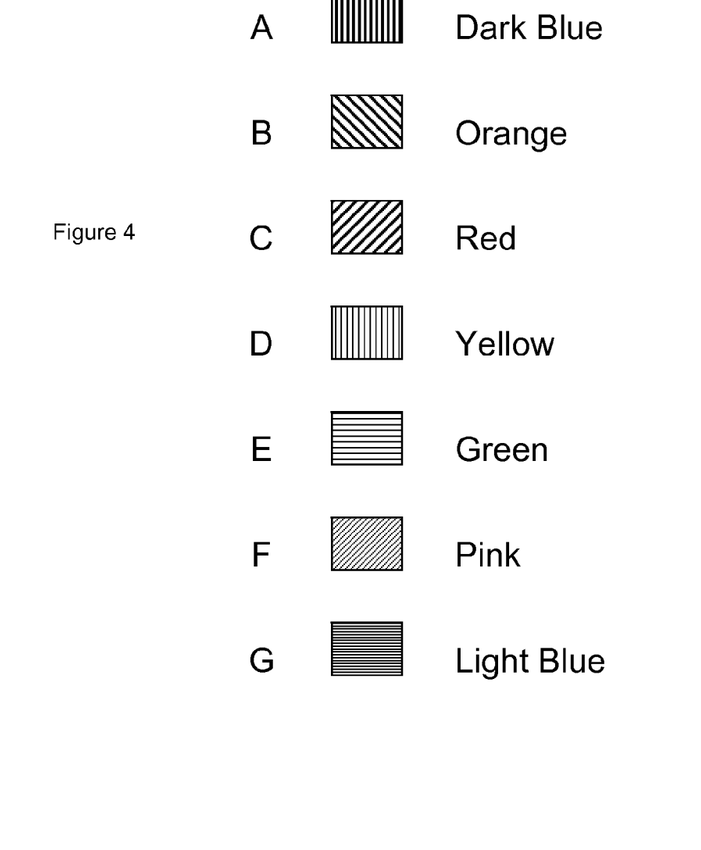
FIG. 4 is a chart showing how colours are allocated to notes.
Figure 5:
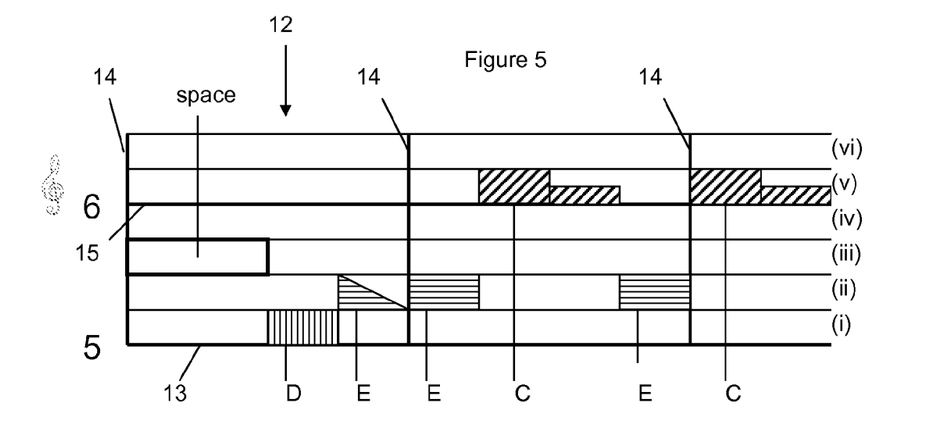
FIG. 5 is an example of the music notation in accordance with one embodiment of the invention.

FIG. 4 is a chart showing the colours allocated to the notes, with different shading identifying the different colours. The colours are allocated as follows:
A—Dark Blue; B—Orange; C—Red; D—Yellow; E—Green; F—Pink; G—Light Blue FIG. 5 shows an embodiment of the notation in use, showing a grid 12 on which are some notes. In this embodiment the notes are in the fifth and sixth octave. There is a base line for the fifth octave, vertical bar lines 14, and a base line 15 for the sixth octave. Fainter lines delineate the individual rows in which note symbols are placed. In this case there are the full four rows for the fifth octave, (i), (ii), (iii) and (iv). Only two rows are displayed for the sixth octave, (v) and (vi). Various not symbols are shown on the grid, including a space, natural notes C, D and E, and an accidental E sharp. In this particular embodiment, for each octave the lowest row such as (i) is reserved for C and D; the next row up (ii) is reserved for E and F; the next row up is reserved for A and G; and the top row is reserved for B. The space symbol may be placed where convenient, and in this case it is in row (iii). Conventional symbols such as the treble clef may be included in the conventional manner.

Figure 6:
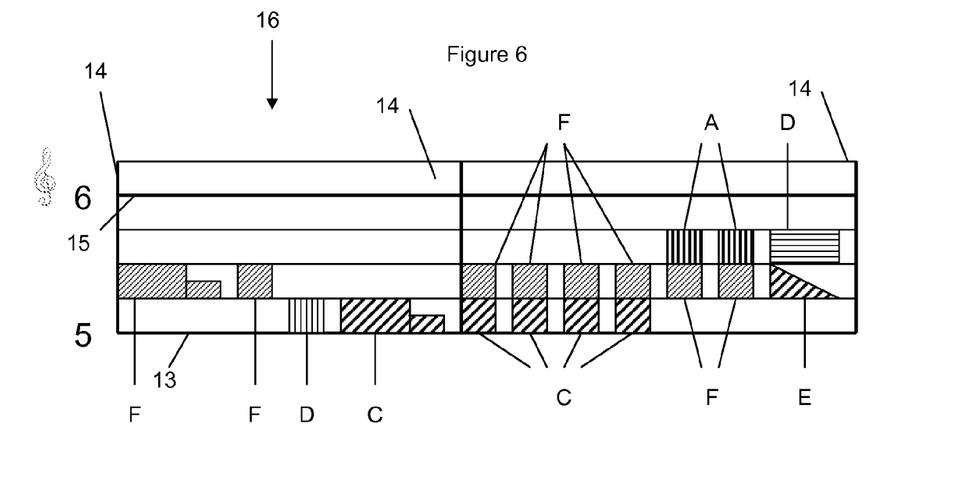
FIG. 6 is an example of the music notation in accordance with another embodiment of the invention.

FIG. 6 shows a more preferred embodiment in which there is a space between each note symbol and the subsequent note symbol, irrespective of their respective row. The underlying grid 16 is similar to the grid 12 of FIG. 5, but the space allocated to a particular bar—the distance between successive bar lines 14, varies dynamically to accommodate the varying numbers of spaces. The grid shows the symbols for various notes. Varying the distance between the bar lines 14 can also be used to accommodate words of a song which would typically be written below the music grid.

It will be appreciated that the notes shown in the embodiments of FIGS. 5 and 6 are for illustrative purposes only.

Figure 7:
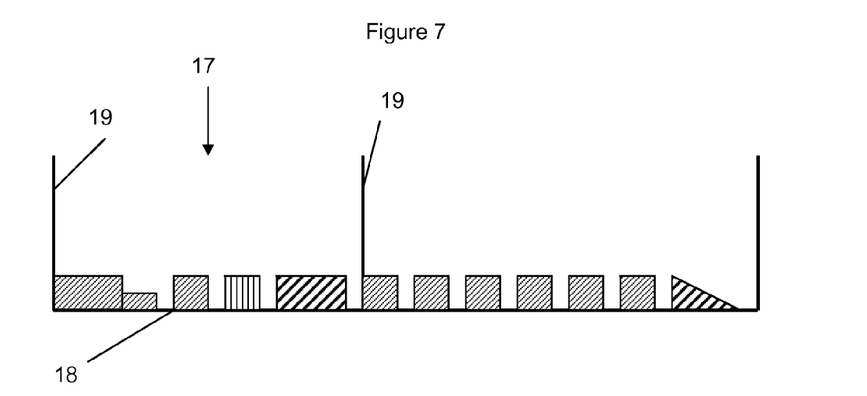
FIG. 7 is an embodiment of the invention using a single line of symbols.

FIG. 7 shows a simple embodiment 17 in which one note only is played at a time, the notes being spaced along a base line 18. The display shows bar lines 19.

Figure 8:
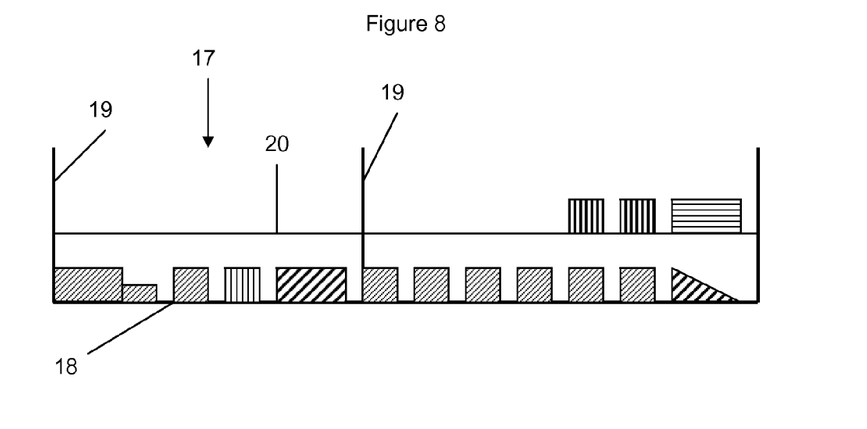
FIG. 8 is an embodiment using two lines of symbols.
Figure 9:
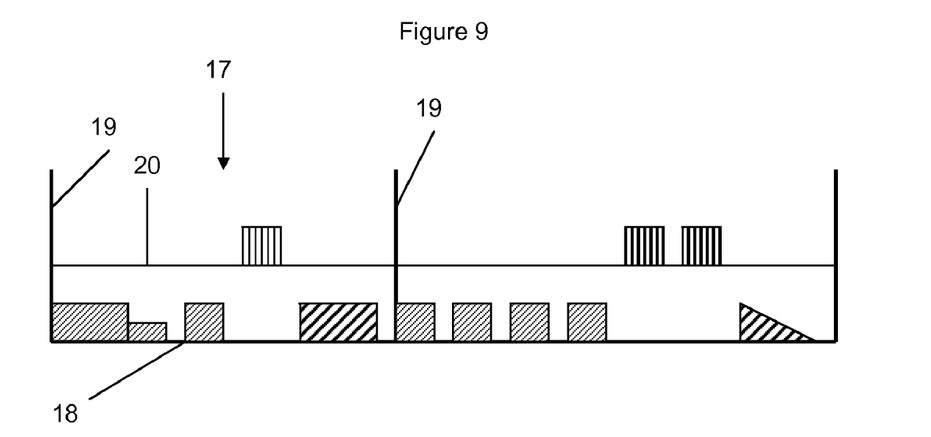
FIG. 9 is an alternative embodiment using two lines of sensors.

FIG. 8 shows a further simple embodiment 20 which is similar to embodiment 17, there being a base line 21 and bar lines 22. However, the display includes a second horizontal line 23. This takes any notes that are played as the same time as notes on the base line 21. In this particular embodiment, notes are not allocated to the lines in accordance with their pitch but only as it become necessary to use the additional line to permit two notes to be played together. FIG. 9 shows the same layout 20, but in this case notes are pre-allocated to the first and second lines in accordance with pitch.

Figure 10:
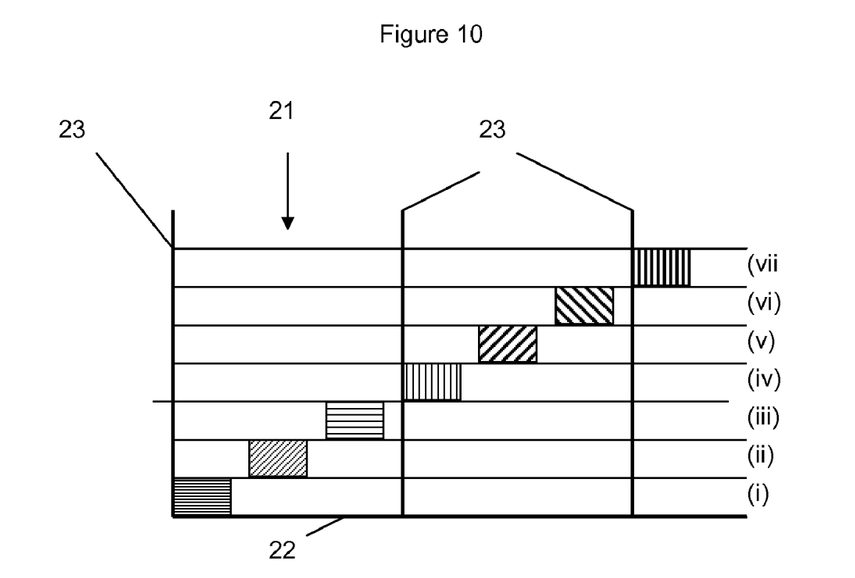
FIG. 10 is an embodiment using seven lines of symbols.

FIG. 10 shows the grid 21 used when a separate line is provided for each of the seven natural notes in an octave. This has a base line 22 and bar lines 23. The seven vertical positions (i) to (vii) are each allocated to one only of the seven natural notes A to G in an octave.

Figure 11:
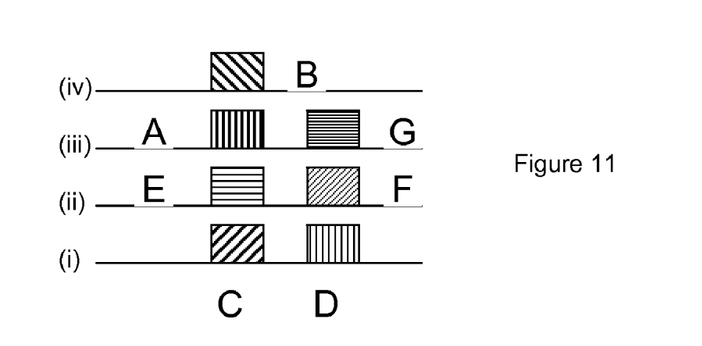
FIG. 11 shows how notes are allocated in an embodiment using four lines of symbols.
Figure 12:
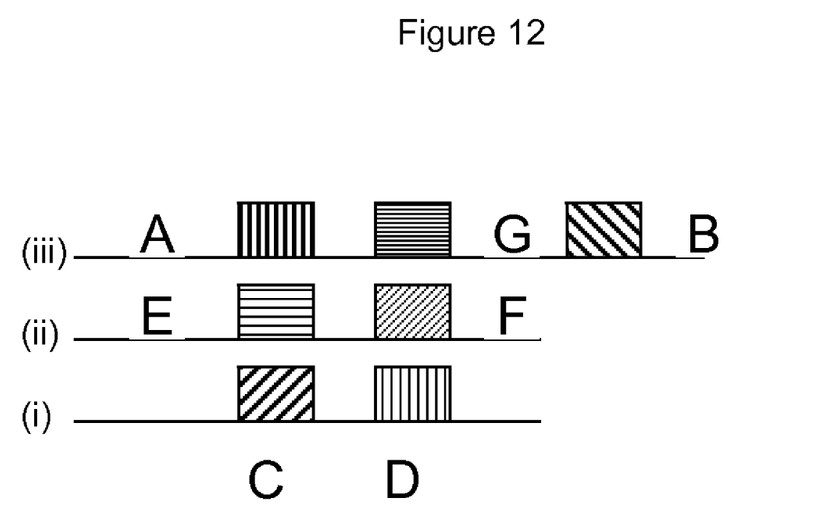
FIG. 12 shows how notes are allocated in an embodiment using three lines of symbols.

FIG. 11 shows how the natural notes are allocated in an arrangement using four lines. The natural notes C and D are allocated to line (i); E and F to line (ii); A and G to line (iii); and B to line (iv). FIG. 12 show how the seven natural notes are allocated in an arrangement using three lines. The natural notes C and D are allocated to line (i); E and F to line (ii); and A, B and G to line (iii).

In all of the above embodiments, if notes from an additional octave above or below the principal octave are required, the grid is extended above or below the principal octave. In preferred arrangements, only as many lines as are necessary for the additional octave are shown, rather than an entire extra grid.

In the case of music for a piano, for example, there may be two distinct grids, one above the other, one being for the left hand and one for the right hand.

The above embodiments are described by way of example only and are not intended to limit the scope of the invention which is defined by the appended claims.

What is claimed is:

1. A method of creating a visual representation of a musical work which includes a plurality of notes, the method comprising the steps of using data processing apparatus (i) to analyse the musical work, (ii) for each note to determine attributes including at least the pitch and duration of the note and (iii) to create a data file which when accessed by the or another data processing apparatus will cause output of the musical work in a form readable by the human eye, in which notes are represented by coloured symbols and the pitch of a note is defined by a combination of the shape and the colour of the symbol representing that note, wherein:
   (a) there is defined a display layout with at least one horizontally extending line on which the symbols representing notes are placed, the horizontal position of a symbol representing a note representing the time for playing the note;
   (b) a first basic symbol shape is assigned to the natural notes in an octave, a second basic symbol shape is assigned to sharp accidentals; and a third basic symbol shape is assigned to flat accidentals, each of the first, second and third basic symbol shapes having a basic horizontal extent corresponding to a basic note duration;
   (c) each of said first, second and third basic symbol shapes is provided with at least one modified form in which the horizontal extent of the modified symbol shape differs from that of the basic symbol shape, the modified symbol shape representing a note whose duration differs from the basic note duration;
   (d) for each of the seven natural notes in an octave the first basic symbol shape is assigned a respective colour
   (e) for each of the sharp accidental notes the second basic symbol shape is assigned the same colour as the first basic symbol shape of the associated natural note; and
   (f) for each of the flat accidental notes the third basic symbol shape is assigned the same colour as the first basic symbol shape of the associated natural note;
   and wherein the symbols representing the natural notes in an octave are each allocated to a specific vertically spaced line, the symbols representing each sharp accidental are each allocated to the same line as the symbols representing the associated natural note, and the symbols representing each flat accidental are each allocated to the same line as the symbols representing the associated natural note.

2. A method as claimed in claim 1, wherein there are two vertically spaced lines and the symbol representing each natural note is allocated to one only of the two lines.

3. A method as claimed in claim 1, wherein there are three lines, the symbol representing each of the seven notes in an octave is allocated to one line only, there are two lines each having symbols representing two notes allocated to them, and one line has symbols representing three notes allocated to it.

4. A method as claimed in claim 1, wherein there are four lines, the symbol representing each of the seven notes in an octave is allocated to one line only, there are three lines each having symbols representing two notes allocated to them, and one line has the symbol representing one note allocated to it.

5. A method as claimed in claim 1, wherein there is further defined a fourth basic symbol shape denoting a rest, the fourth basic symbol shape having a basic horizontal extent corresponding to a basic rest duration and being provided with at least one modified form in which the horizontal extent of the modified symbol shape differs from that of the basic symbol shape, the modified symbol representing a rest whose duration differs from the basic rest duration.

6. A method as claimed in claim 1, wherein there is a space between each symbol and the next symbol.

7. A method as claimed in claim 6, wherein there are lines dividing the musical work into bars and the visible extent of a bar is varied dynamically to accommodate the number of symbols and spaces in the bar.

8. A method as claimed in claim 1, wherein the first basic symbol is a rectangle, the second and third basic symbols are right angle triangles having hypotenuses with one of the shorter sides extending vertically, the other of the shorter sides extending horizontally, the hypotenuse extending diagonally downwards towards the right of the vertically extending side for one of the accidental symbols, and the hypotenuse extending diagonally downwards towards the left of the vertically extending side for the other of the accidental symbols.

* * * * *